United States Patent
Nelson et al.

(10) Patent No.: US 6,210,795 B1
(45) Date of Patent: Apr. 3, 2001

(54) HEAT-SEALABLE ADHESIVE LABEL WITH SPACER PARTICLES

(75) Inventors: Richard A. Nelson, Nashua, NH (US); David W. Avison, Townsend, MA (US); Mark R. Messinger, Manchester, NH (US)

(73) Assignee: Nashua Corporation, Nashua, NH (US)

( * ) Notice: Subject to any disclaimer, the term of this patent is extended or adjusted under 35 U.S.C. 154(b) by 0 days.

(21) Appl. No.: 09/427,335

(22) Filed: Oct. 26, 1999

Related U.S. Application Data

(60) Provisional application No. 60/105,651, filed on Oct. 26, 1998.

(51) Int. Cl.$^7$ .................................. C09J 7/02; B32B 7/12
(52) U.S. Cl. .................. 428/347; 428/343; 428/355 R; 428/40.1; 428/40.2; 428/146; 428/147; 428/149; 428/349; 428/355 RA; 428/355 BL; 428/355 AC; 428/355 N; 283/81
(58) Field of Search ................. 428/343, 355 R, 428/40.1, 40.2, 146, 147, 149, 349, 355 RA, 355 BL, 355 AC, 355 N; 283/81

(56) References Cited

U.S. PATENT DOCUMENTS

| | | | |
|---|---|---|---|
| 4,427,774 | * 1/1984 | Hume, III | 428/462 |
| 4,716,052 | * 12/1987 | Waugh et al. | 427/147 |
| 4,837,075 | 6/1989 | Dudley | 428/220 |
| 4,883,697 | 11/1989 | Dornbusch et al. | 428/35.7 |
| 4,986,866 | 1/1991 | Ohba et al. | 156/220 |
| 5,008,139 | * 4/1991 | Ochi et al. | 428/40 |
| 5,238,630 | 8/1993 | Tung | 264/132 |
| 5,254,302 | 10/1993 | Yamanaka | 264/129 |
| 5,266,377 | 11/1993 | Kinoshita et al. | 428/141 |
| 5,296,535 | 3/1994 | Nesiewicz et al. | 524/446 |
| 5,332,542 | 7/1994 | Yamanaka et al. | 264/509 |
| 5,472,757 | * 12/1995 | Ogawa | 428/40 |
| 5,562,962 | 10/1996 | Tung | 428/200 |
| 5,616,384 | 4/1997 | Goettmann et al. | 428/36.1 |
| 5,620,775 | * 4/1997 | LaPerre | 428/149 |
| 5,670,254 | * 9/1997 | Akhter | 428/349 |
| 5,733,615 | 3/1998 | Rackovan et al. | 428/35.7 |
| 5,958,537 | * 9/1999 | Akhter | 428/40.2 |

FOREIGN PATENT DOCUMENTS

| | | | |
|---|---|---|---|
| 0919603 A1 | 6/1999 | (EP) | C09J/9/00 |
| 1530192 | 10/1968 | (FR) . | |
| 2201681 | 9/1988 | (GB) | C09J/3/14 |
| 59-164377 | 9/1984 | (JP) | C09J/3/00 |
| 03079684 | 4/1991 | (JP) | B65D/25/20 |
| 04100879 | 4/1992 | (JP) | C09J/7/02 |
| 11217548 | 8/1999 | (JP) . | |

\* cited by examiner

*Primary Examiner*—Daniel Zirker
*Assistant Examiner*—Frederick G. Dean
(74) *Attorney, Agent, or Firm*—Testa, Hurwitz & Thibeault, LLP

(57) ABSTRACT

Disclosed is a heat-sealable adhesive label with a built-in spacer and methods of its manufacture. The adhesive label of the present invention includes a substrate having a first surface and a second surface, and an adhesive coating disposed on the first surface of the substrate. The adhesive coating includes an adhesive and a plurality of spacer particles that impart roughness to the adhesive coating. Methods of making and using a heat-sealable adhesive label also are disclosed.

17 Claims, No Drawings

HEAT-SEALABLE ADHESIVE LABEL WITH SPACER PARTICLES

This application claims the benefit of copending U.S. Provisional Patent Application Serial No. 60/105,651, filed Oct. 26, 1998, the entire disclosure of which is incorporated by reference herein.

FIELD OF THE INVENTION

The invention generally relates to adhesive coatings. More specifically, the invention relates to heat-sealable adhesive coatings containing spacer particles, and methods for making and using the same.

BACKGROUND OF THE INVENTION

In-mold labeling is a process in which a heat-sealable label is applied to a blow molded article during the molding process. The resulting label, if properly applied, appears to be not a label at all, but an integral part of the bottle itself. Examples of such labeled articles include, among others, food and beverage containers, liquid detergent containers, motor oil containers, and bleach and other household cleaning product containers.

In-mold labeling eliminates a separate labeling step after an article is formed. Typically, in-mold labels are cut to size from a sheet of substrate coated with an adhesive, then stacked in a feeding magazine for the mold. One or more labels are fed into the mold and positioned against the sidewalls of the mold cavity by a mechanical or vacuum operated device. Vacuum pressure often is used to maintain the proper position of the label during this stage of the labeling process.

The mold then typically is closed, and a parison or molten plastic balloon is blown into the closed mold cavity. The parison typically is a balloon of molten thermoplastic resin, such as high density polyethylene, polypropylene, or polyethyleneterephthalate (PET). As the parison contacts the adhesive side of the label, the heat from the parison activates the heat-sealable adhesive layer which causes the label to adhere to the blown article as the pressure of the parison against the label increases. Typically, the mold sidewalls are cooled, and thus, the molten plastic article is hardened by cooling. Subsequently, the labeled article is removed from the mold.

One general problem encountered with in-mold labeling is that the substrate film used for the labels typically is not porous. Without permitting the escape of air or volatiles from between the label and the bottle, the air or volatiles may be trapped between the label and the article which results in air pockets or blisters.

Another general problem encountered with adhesive labels, whether for in-mold or other applications, is that in feeding the adhesive labels from a stack of labels from, for example, a feed magazine, the labels may tend to stick together. This problem generally is referred to as "blocking." Blocking also can be a problem in feeding labels from a roll of labels when the transfer of adhesive from the adhesive side of one layer of labels to the print side of the successive layer of labels causes the layers to stick together. Blocking is particularly problematic in commercial labeling processes where labeling is carried out at high speeds and each piece of apparatus along a production line, including the feed magazine, must be accurately synchronized and reliable. Blocking may create downtime for the line and/or an increase in defective articles.

SUMMARY OF THE INVENTION

An adhesive label has been developed which provides improved feeding properties as well as improvements in the appearance of the adhesive label after application to an article. The adhesive label of the present invention generally includes spacer materials in the adhesive layer to provide these improved properties. The adhesive label of the present invention minimizes blocking, double feeding, and wrinkling of labels during feeding and application of labels, for example, in an in-mold labeling process. Furthermore, the adhesive label of the present invention minimizes or eliminates the formation of air pockets behind the applied label which can cause wrinkling and/or blistering. Also, the adhesive label of the present invention generally reduces or eliminates any transfer of adhesive from the adhesive coating of the labels to the labeling and/or printing equipment or to the print side of adjacent labels.

The adhesive label of the present invention generally includes a substrate having a first surface and a second surface and an adhesive coating disposed on the first surface of the substrate. The adhesive coating includes an adhesive and a plurality of spacer particles that impart roughness to the adhesive coating. In one embodiment, the spacer particles have an average particle size of between about 8 microns and about 60 microns. In another embodiment the density of the spacer particles is from about 0.5 g/cm$^3$ to about 2.0 g/cm$^3$. In yet another embodiment, the spacer particles are spheroidal.

In certain embodiments, the spacer particles may be plastic particles including polyethylene particles, acrylic particles and polystyrene particles, starch particles including unmodified potato starch, corn starch and wheat starch, and/or glass particles. Spacer particles of the invention also may be fibrous. In certain embodiments, an adhesive may be selected from the group consisting of ethylene copolymers including ethylene-vinyl acetates, polyvinyl acetates, styrene-butadiene copolymers, polystyrenes, acrylics including ethylene acrylates, methacrylics, ethylene methacrylates, polyurethanes and combinations of these adhesives.

An adhesive label can be manufactured economically using methods of the invention. In a broad form of the method, a substrate having a first surface and a second surface is provided. An adhesive coating then is applied to the first surface of the substrate. The adhesive coating includes an adhesive and a plurality of spacer particles that imparts roughness to the adhesive coating.

In one embodiment, the adhesive coating is applied by dispersing the plurality of spacer particles in an aqueous dispersion including an adhesive to form an adhesive coating mixture. The adhesive coating mixture then is coated onto the first surface of the substrate. The adhesive coating mixture then is dried to form the adhesive coating. In another embodiment, the adhesive may be a liquid, e.g. melted, and mixed with a plurality of spacer particles to form an adhesive coating mixture, and then applied to the first surface of the substrate. The adhesive coating mixture then may be solidified, e.g., by allowing the adhesive coating mixture to cool to form an adhesive coating or by curing the adhesive. In yet another alternative embodiment, an adhesive first may be applied to the first surface of the substrate and then a plurality of spacer particles added to the adhesive to form an adhesive coating mixture. The adhesive coating mixture may then be solidified to form an adhesive coating.

An adhesive label of the present invention can be used in accordance with methods of the present invention. In a broad sense, a plurality of adhesive labels of the present invention is stacked, e.g., in a feed magazine. An individual adhesive label is fed from the stack of adhesive labels and then applied to an article to be labeled, e.g., in a commercial labeling process.

It should be understood that the order of the steps of the methods of the invention is immaterial so long as the invention remains operable, i.e., a substrate must be provided prior to applying an adhesive coating to the substrate.

The invention will be understood further upon consideration of the following drawings, description and claims.

DETAILED DESCRIPTION OF THE INVENTION

The present invention broadly is directed to a heat-sealable adhesive label having a plurality of spacer particles in its adhesive coating. The label of the present invention reduces the formation of blisters and/or air pockets which may cause wrinkling and blistering of the applied label, particularly in in-mold applications. The present invention further is directed to providing heat-sealable adhesive labels which reduce the amount of blocking, double feeding, and wrinkling of the labels when stacked and fed using commercial labeling equipment. Also the label of the present invention generally reduces or eliminates any transfer of adhesive from the adhesive coating of the labels to the labeling and/or printing equipment. Although the invention will be described with specific reference to heat-sealable adhesive labels, it should be understood that the general concepts and principles taught herein apply to other sheet-fed labels and labeling systems.

As used herein, the term "spacer particle" means any material which may be used to impart surface roughness to an adhesive layer when combined with an adhesive and applied to a substrate. A spacer particle may be fibrous and its average particle size related to its diameter.

A "spheroidal particle" is a spacer particle substantially resembling a sphere. A spheroidal particle may contain surface incongruities and irregularities but has a generally circular cross-section in substantially all directions. An "ellipsoidal particle" is a spacer particle substantially resembling an ellipsoid of revolution. An ellipsoid of revolution has two substantially equal minor axes and one larger major axis.

One aspect of the present invention is an adhesive label which includes a substrate having a first surface and a second surface, and an adhesive coating disposed on the first surface of the substrate. The adhesive coating includes an adhesive and a plurality of spacer particles that impart roughness to the adhesive coating.

The substrate may be any substrate that may be used for labels, including plastic films such as polyethylene or polypropylene film, or polyethylene terephthalate film, commonly known as Mylar®, polyextruded photobase paper or paper. Suitable substrates may be opaque, clear or translucent. The substrate may be printed on one or both sides. The substrate may be further coated with one or more layers of materials which provide protection and/or impart desirable visual characteristics to the adhesive label. The adhesive labels of the present invention also may include other materials or layers which are known in the art and are used for the particular application.

Any adhesive generally may be used in accordance with the present invention. Suitable heat-sealable adhesives for in-mold label applications are well known in the art and include, but are not limited to, copolymers of ethylene such as an ethylene-vinyl acetate, polyvinyl acetates, styrene-butadiene copolymers, polystyrenes, acrylics such as an ethylene acrylate, methacrylics such as an ethylene methacrylate, or any combination of these adhesives.

A preferred ethylene-vinyl acetate latex is a modified ethylene-vinyl acetate latex sold under the name ADCOTET™ 37P295 by Morton International (Chicago, Ill.). A preferred styrene-butadiene copolymer is a styrene-butadiene latex sold under the name Latex DL™ 233NA available from Dow Chemical Company (Midland, Mich.). A preferred polystyrene is the polystyrene latex sold under that name OPACIFIER™ 607 made by Morton International (Chicago, Ill.).

Suitable heat-sealable adhesives for other than in-mold label applications are well known in the art and include, but are not limited to polyurethanes, acrylics, etlhylene-vinyl acetates, and any combination of these adhesives. A preferred polyurethane is sold under the name Sancure™ 1601 by B. F. Goodrich (Cleveland, Ohio). Many other heat-sealable adhesives also are known in the art to which spacer particles may be added to produce adhesive labels in accordance with the present invention.

Spacer particles are used to impart roughness to an adhesive layer when combined with an adhesive and applied to a substrate. Suitable spacer particles include materials such as starch, e.g. unmodified potato starch, cornstarch, or wheat starch. Spacer particles also can be glass or plastic particles such as polyethylene particles, acrylic particles and polystyrene particles. Fibers, such as polymeric fibers, also may be used as spacer particles. Of course combinations of the above spacer particles may be used in accordance with the present invention.

The composition of the spacer particles preferably is non-blocking so that at the points of contact, between one adhesive label and the next adhesive label in a stack, contact blocking is minimized. The term "non-blocking" means a material which has a tendency to not stick to other surfaces. Non-blocking materials include starch, polyethylene and glass. In particular, unmodified potato starch from A. E. Staley Manufacturing Company (Decatur, Ill.) and wheat starch from Midwest Grain Products (Achison, Kans.) are preferred. Also suitable as spacer particles are polyethylene particles sold under the name ACUMIST™ C-18 by Allied Signal Inc. (Morristown, N.J.).

In a stack of labels, the spacer particles reduce the surface contact between the adhesive side of one label and the non-adhesive side of an adjacent label. Accordingly, surface friction between the two labels that tends to impede the removal of labels is reduced. This reduced surface contact also reduces the area available for adhesive to adhere to the next label, and thus decreases adhesion that may occur between labels in a stack of labels, particularly during high die cutting of the labels. "High" die cutting refers to cutting a stack of labels with a die as opposed to cutting individual sheets of labels with a die. As a result, the labels of the present invention reduce the occurrence of blocking, double feeds, folded labels, edge weld, and/or wrinkled labels.

Among the important physical properties of the spacer particles are their size, shape, density, and concentration. The size and the shape affect the roughness of the adhesive coating. The density affects how long the spacer particles remain suspended in the adhesive coating mixture. The quantity of spacer particles present in the adhesive coating also affects the roughness of the coating.

Generally, the size of the spacer particles preferably is small enough so that they readily are not discernible through the label on the finished product. However, the spacer particles should be large enough to impart a sufficient degree of roughness to the surface of the adhesive coating on the label to permit trapped volatiles to escape and to reduce surface contact between labels when they are stacked. Preferably the spacer particles have an average particle size of between about 8 microns and about 60 microns, and more preferably between about 15 microns and about 40 microns. If a paper substrate is used the average particle size of the spacer particles preferably is between about 15 microns and about 25 microns, and more preferably about 20 microns. If a plastic film is used for a non-in-mold application, the average particle size preferably is between about 15 microns and about 25 microns, and more preferably about 20 microns. If a plastic film is used for in-mold applications, the average particle size preferably is between about 25 microns and about 35 microns, and more preferably about 30 microns. Particle size averages are as calculated using a transmitted laser measuring device such, for example, a LA-910™ Laser Particle Size Distribution Analyzer from Horiba Laboratory Products (Irvine, Calif.).

Larger spacer particles may be used that readily will not be discernable in the applied label if made of materials which have a melting temperature higher than that of the adhesive, but below that experienced during the application of the label to the article to be labeled. Since the spacer particles can melt and blend into the remainder of the adhesive coating during the application of the label, the larger spacer particles are unnoticed in the finished label. Larger spacer particle also may be used if the substrate is sufficiently thick such that the spacer particles will not show through the applied label.

The shape of the spacer particles and concentration of the spacer particles in the adhesive coating also may influence the roughness of the adhesive coating. Preferably, the spacer particles are spheroidal or ellipsoidal in shape. However, the spacer particles may be any shape provided that they impart roughness to the adhesive coating. The spacer particles preferably are present in the amount of between about 2% and about 20% of the adhesive coating based on the dry weight of the adhesive.

The density of the spacer particles affects the suspension of spacer particles in the adhesive coating mixture before, during, and after the substrate is coated. The longer the spacer particles remain in suspension, the longer they will remain uniformly dispersed in the adhesive coating mixture. Uniform dispersion increases the uniformity of roughness imparted to the adhesive coating between the individual adhesive labels produced from the same batch of adhesive coating mixture. Preferably, the density of the spacer particles is within the range of 0.5 g/cm$^3$ and about 2.0 g/cm$^3$, more preferably between about 1.0 g/cm$^3$ and about 1.5 g/cm$^3$.

Various additives also may be added to an adhesive coating, depending on the particular application. For example, thickeners such as acrylics may be added to the coating to increase its viscosity. Acrylics, such as those sold under the name Carboset 514H available from B. F. Goodrich (Cleveland, Ohio) are suitable for use in accordance with the present invention. Non-blocking agents also may be added, e.g., microcrystalline wax. A preferred microcrystalline wax is sold under the name ME48040 available from Michelman (Cincinnati, Ohio). Fluorescent brighteners such as those sold under the name Tinopal™ SCP available from Ciba-Geigy (Greensboro, N.C.) may be used in the present invention. Dyes also may be added to the adhesive coatings to create a background tint or color in translucent labels or to indicate the adhesive side of the substrate. Adhesion promoters such as silanes may also be added in accordance with the present invention. A preferred silane is sold under the name WETLINK 78 and is available from Witco (Cincinnati, Ohio).

Another aspect of the present invention is a method of making an adhesive label. A method of making an adhesive label of the present invention generally includes: (i) providing a substrate having a first surface and a second surface, and (ii) applying an adhesive coating to the first surface of the substrate, the adhesive coating comprising an adhesive and a plurality of spacer particles that impart roughness to the adhesive coating. More specifically, a substrate is provided as described above. An adhesive coating comprising an adhesive and a plurality of spacer particles as described above are then applied to the substrate.

Application of the adhesive coating may be accomplished by: (i) providing an aqueous dispersion including an adhesive; (ii) mixing a plurality of spacer particles and the aqueous dispersion to form an adhesive coating mixture, (iii) applying the adhesive coating mixture to the first surface of the substrate, and (iv) drying the adhesive coating mixture to form an adhesive coating, where the plurality of spacer particles in the adhesive coating impart roughness to the adhesive coating. Alternatively, in step (i) a solvent dispersion including an adhesive may be provided and in step (ii) the solvent dispersion may be mixed with a plurality of spacer particles to form an adhesive coating mixture.

The water and/or solvent is removed from the adhesive coating mixture in the drying step, leaving a dry adhesive coating on the substrate which permits easy handling and storage of the adhesive labels. Drying typically is achieved by running the adhesive coated substrate through one or more drying zones, where the coated substrate is subjected to elevated temperatures which evaporate any water and/or solvents present in the coating. For example, the coating may be dried over a series of nine drying zones ranges in temperature from about 150° F. to about 160° F. Typically, the drying step takes from about 10 seconds to about 20 seconds to dry. However, this time may vary depending on the amount and volatility of the water and/or solvents present in the mixture.

Alternatively, application of the adhesive coating may be accomplished by: (i) providing a liquid adhesive and a plurality of spacer particles, (ii) mixing the liquid adhesive and the plurality of spacer particles to form an adhesive coating mixture, (iii) applying the adhesive coating mixture the first surface of the substrate, and (iv) solidifying the adhesive coating mixture to form an adhesive coating, where the plurality of spacer particles impart roughness to the adhesive coating. The adhesive coating mixture may be solidified, for example, by curing the liquid adhesive. Alternatively, the liquid adhesive may be in a molten state when provided, mixed with the plurality of spacer particles and applied to the first surface of the substrate, and subsequently solidified by cooling the liquid adhesive to form the adhesive coating.

In another embodiment, application of the adhesive coating may be accomplished by: (i) providing an adhesive and a plurality of spacer particles, (ii) applying the adhesive to the first surface of the substrate, (iii) applying the plurality of spacer particles to the adhesive to form an adhesive coating mixture on the first surface of the substrate, and (iv) solidifying the adhesive coating mixture to form an adhesive coating, where the plurality of spacer particles impart roughness to the adhesive coating. The coating may be solidified as disclosed above, i.e., by drying, curing or cooling.

In another embodiment, spacer particles may be added to an adhesive layer and extruded onto a substrate or coextruded with a substrate using methods known in the art.

In any of the above embodiments, the adhesive coating mixture should be mixed to obtain a uniform dispersion of the spacer particles in the adhesive coating mixture prior to application to a first surface of a substrate. The adhesive coating mixture may be applied to a first surface of a substrate using techniques in the art. For example, if the adhesive coating mixture is an aqueous dispersion, it may be applied by conventional coating methods such as gravure coating, blade coating, or roll coating. Similarly, if the adhesive were applied to a first surface of the substrate prior to application of the spacer particles to the adhesive, the above techniques may be used to apply the adhesive.

Alternatively, if a plurality of spacer particles were added to molten, liquid adhesive to form the adhesive coating mixture, hot melt coating techniques known in the art may be used to apply the adhesive coating mixture to the substrate. Similarly, if a molten, liquid adhesive were applied to a first surface of a substrate prior to applying a plurality of spacer particles to the adhesive, hot melt techniques known in the art may be used.

In certain applications, the non-adhesive surface of the substrate may be printed and/or further treated with other coatings, e.g., a gloss coat or a protective overcoat, prior or subsequent to application of the adhesive coating. For example, adhesive labels may be printed via conventional printing means such as offset or flexographic laser or ink-jet printers prior to application. Moreover, additional coatings also may contain pigments or fillers to enhance the appearance of the label. Additional coatings and/or printing may be added to the adhesive label before or after the adhesive coating is applied to a substrate.

In the present invention rolls or sheets of adhesive coated substrate preferably are formed first and then individual labels cut from these sheets or rolls of adhesive coated substrate. The labels may be cut with a die using techniques known in the art.

Another aspect of the present invention relates to a method of using an adhesive label of the invention. A preferred method of using adhesive labels of the present invention generally includes: (i) stacking a plurality of adhesive labels of the invention, (ii) removing an individual adhesive label from the stack of adhesive labels, and (iii) applying the individual adhesive label to an article to be labeled.

In preferred embodiments, the labels are stacked such that the first surface of each label, e.g., the adhesive coated surface, is adjacent to the second surface of the next label, e.g., the non-adhesive coated surface. The roughness of the adhesive coated surface of the labels of the invention reduces the coefficient of friction between the stacked labels and minimizes any adhesion between the labels. The stack of labels then may be placed into a feed magazine for feeding labels into a machine designed for application of the adhesive labels to articles of manufacture. Feed magazines are known in the art and typically are used in assembly lines to feed individual labels for application to articles of manufacture.

An individual label may be removed from a stack of adhesive labels either manually or mechanically using apparatus known in the art. Subsequently, the individual label is applied to an article to be labeled using the appropriate technique. During distribution of the individual labels from the stack, the labels may fail to feed properly or "block" due to surface tension and/or adhesion between adjacent labels thereby resulting in misapplied labels and/or a shut down of the assembly line to clear the blocked labels.

It has been observed that the labels of the present invention demonstrate a reduction in the incidences of blocking. Without wishing to be bound by any particular theory, it is believed the roughness of the adhesive coating minimizes the surface contact between the adhesive coated surface of each label with the non-adhesive coated surface of the next label in a stack, particularly if the labels were high die cut. As a result, the coefficient of friction between individual labels in the feed magazine is reduced. The reduced surface contact also may minimize the occurrence of labels adhering to each other in a stack. This results in a reduction in blocking, double feeding, folding, and/or wrinkling which occurs during feeding.

It also has been observed that the labels of the present invention reduce or eliminate the transfer of adhesive from the adhesive coating of the labels to the labeling and/or printing equipment. While not wishing to be bound by any theory, this improvement is believed to be due to reduced surface contact between the adhesive labels of the present invention and the equipment.

In an in-mold assembly line, heat-sealable labels are fed to a mold cavity which is shaped to match the needs of the article to be labeled. After it enters the mold, the adhesive label is positioned against the sidewalls of the mold cavity where it typically is held in place by a vacuum until the molded plastic balloon, commonly referred to by practitioners in the art as a parison, is blown into the closed mold cavity. As the parison comes into contact with the adhesive side of the label, the heat from the parison activates the heat-sealable adhesive layer which causes the label to be adhered to the blown article as the pressure of the parison increases against the label.

Typically, the sidewalls of the mold cavity are chilled, e.g., with cold water. Thus, upon striking the mold cavity, the temperature of the molten plastic article drops and the article is hardened with an adhered label. The heat from the parison is typically between about 250° F. and about 450° F. and the pressure between the parison and the mold cavity is about 100 pounds per square inch. These parameters vary depending on numerous factors including, among others, the type of thermoplastic parison used to construct the article.

Without wishing to be bound to any theory, it is believed that the rough surface of the adhesive coating allows air or volatiles to flow laterally across the surface of the label and escape from under the label surface. That is, as the parison expands in the mold cavity and contacts the adhesive surface of the label, air and volatiles escape through the porosity and/or channels created between the label and the parison by the spacer particles. If the temperature experienced by the label is higher than the melting temperature of the spacer particles, the spacer particles may deform and/or melt within the adhesive coating to create a smooth surface after the volatiles have escaped.

Generally, the performance characteristics of a heat-sealable adhesive label may be predicted by measuring the coefficient of friction of the coating, the blocking value of the coated labels, the resistance to lateral airflow across the surface of the coated substrate, the adherence of the label, and transfer.

The coefficient of static friction can be measured using TAPPI test method T-815. This test frequently is called the slide angle test because the coefficient of friction number is the tangent of the slide angle. This test and other equivalent test methods are generally known in the art.

The blocking value can be measured using a test method wherein labels are stacked together so that the adhesive layer on each label is in contact with the non-adhesive layer of the next label. These stacks of labels then are placed in ovens at a range of temperatures and at a constant pressure and allowed to equilibrate. For example, labels conditioned for about one hour at about 10 psi in a series of ovens set at 85° F., 100° F., 105° F., 110° F., 115° F. and 120° may be used to predict blocking problems that may occur over a range of temperatures. The 110° F. reading typically is used to predict blocking in in-mold applications. The 100° F. reading typically is used to predict blocking in non-in-mold applications.

After equilibration, each stack of labels is then removed from the ovens and after cooling the individual labels are removed manually from the stack of labels one at a time. When the labels are removed freely, they are given a rating of zero for that temperature. When the samples adhere very slightly, a rating of one is reported for that temperature. When there is a slight cling between the labels, a rating of two is reported for that temperature. When there is actual sticking between labels, but the adhesive is not damaged, a rating of three is reported for that temperature. When the labels stick to each other to the extent of damaging the adhesive coating, a rating of four is reported for that temperature.

The resistance to lateral airflow across the surface of the coated substrate, also referred to as roughness, can be measured using standard techniques. For the following examples, the so called "print-surf" method was used which measures the mean gap between a test surface and a foot pressed against it, by passing air through this gap under controlled conditions and measuring the pressure difference across the foot. This method is set forth in TAPPI Test Method 555. The roughness reported is the cube root mean cube gap in micrometers. The higher the number, the rougher the surface, and the greater the ability to allow air to flow laterally across the surface. Although blistering can only be evaluated in actual practice, the ability of a surface to permit the lateral flow of air provides an indication of how the label will operate during adhesion.

Adherence can be measured as the peel strength and is measured in grams per linear inch. Peel strength may be measured by a Keil Tester manufactured by Dow Corning (Midland, Mich.) or by other instruments commonly used in the industry.

The tendency of the adhesive to transfer from the back of a label to labeling or printing equipment can be measured by heating a hand held roller to the operating temperature of the labeling and/or printing equipment and passing the roller across the back of a sheet of labels. For example, heating a roller to about 140° F. and passing it across the back of a sheet of labels may use to approximate conditions within a conventional printer. A visual observation then is made as to whether any adhesive has transferred to the roller and an affirmative or negative determination of transfer is reported.

Finally, as will be appreciated by a skilled practitioner, the labels of the invention may be used in any application where adhesive labels are stacked and fed mechanically. The invention further is illustrated by the following non-limiting examples.

COMPARATIVE EXAMPLE 1

Adhesive Lable With Polypropylene Substrate

Adhesive labels were prepared for an in-mold application. An aqueous dispersion was created with the following ingredients:

| Ingredient | Dry Weight (g) | Wet Weight (g) |
|---|---|---|
| Water | 0 | 320.0 |
| Ammonia | 0 | 8.0 |
| Adhesive | | |
| Ethylene-vinyl acetate latex | 810.1 | 2025.3 |
| Styrene-butadiene latex | 55.3 | 110.7 |
| Polystyrene latex | 214.4 | 536.0 |

The ethylene-vinyl acetate latex used for these examples is a modified ethylene-vinyl acetate latex sold under the name ADCOTE™ 37P295 by Morton International (Chicago, Ill.). The styrene-butadiene latex used is sold under the name Latex DL™ 233NA made by Dow Chemical Company (Midland, Mich.). The polystyrene latex used is sold under that name OPACIFIER™ 607 by Morton International (Chicago, Ill.). The above ingredients were mixed for about 10 minutes at room temperature so that the ingredients uniformly were dispersed.

This dispersion was coated onto a 4 mil thick polypropylene film obtained from Granwell Products (West Caldwell, N.J.) using a gravure coater and dried for about 10 seconds in an oven set at about 155° F. The roughness value of the coating was 1.13 micrometers, the coefficient of friction was 0.816, and the blocking value at 110° F. was 2–3.

EXAMPLE 2

Starch Spacer Particles

Adhesive labels were prepared as in Example 1 with the addition of starch spacer particles to the adhesive coating. An aqueous dispersion was created with the following ingredients:

| Ingredient | Dry Weight (g) | Wet Weight (g) |
|---|---|---|
| Water | 0 | 3200 |
| Ammonia | 0 | 8.0 |
| Adhesive | | |
| Ethylene vinyl acetate latex | 810.1 | 2025.3 |
| Styrene butadiene latex | 55.3 | 110.7 |
| Polystyrene latex | 214.4 | 536.0 |
| Unmodified potato starch | 180.0 | 180.0 |

The adhesives were the same as those used in Example 1. The unmodified potato starch was obtained from A.E. Staley Manufacturing Company (Decatur, Ill.). The unmodified potato starch spacer particles generally were spheroidal and had a mean particle size of from about 30 microns to about 40 microns. These ingredients were mixed for about 10 minutes at room temperature so that the ingredients uniformly were dispersed and the unmodified potato starch was suspended in the dispersion.

This dispersion was coated into a 4 mil thick polypropylene film with a gravure coater and dried for about 10 seconds in an oven set at about 155° F. The roughness value of the coating was 5.11 micrometers, the coefficient of friction was 0.575, and the blocking value at 110° F. was 1.

EXAMPLE 3

Polymeric Spacer Particles

Adhesive labels were prepared as in Example 1 with the addition of polymeric spacer particles to the adhesive coating. An aqueous dispersion was created with the following ingredients:

| Ingredient | Dry Weight (g) | Wet Weight (g) |
|---|---|---|
| Water | 0 | 320.0 |
| Ammonia | 0 | 8.0 |
| Adhesive | | |
| Ethylene vinyl acetate latex | 810.1 | 2025.3 |
| Styrene butadiene latex | 55.3 | 110.7 |
| Polystyrene latex | 214.4 | 536.0 |
| Polyethylene Particles | 180.0 | 180.0 |

The adhesives were the same as those used in Examples 1–2. The polyethylene spacer particles were "micronized" polyethylene particles sold under the name ACUMIST™ C-18 by Allied Signal Inc. (Morristown, N.J.). These polyethylene particles had an average particle size of about 18 microns, were ellipsoidal in shape, and had a density of about 0.95 g/cm$^3$. These ingredients were mixed for about 10 minutes at room temperature so that the ingredients uniformly were dispersed and the spacer particles were suspended in the dispersion.

This dispersion was coated onto a 4 mil thick polypropylene film with a gravure coater and dried for about 10 seconds in an oven set at about 155° F. The roughness of the coating was 6.54 micrometers, the coefficient of friction was 0.568, and the blocking value at 110° F. was 1–2.

The results of Examples 1–3 are summarized as follows:

| | Roughness ($\mu$m) | Coefficient of Friction | Blocking at 110° F. |
|---|---|---|---|
| Example 1 (no spacer particles) | 1.13 | 0.816 | 2–3 |
| Example 2 (starch spacer particles) | 5.11 | 0.575 | 1 |
| Example 3 (polymeric spacer particles) | 6.54 | 0.568 | 1–2 |

COMPARATIVE EXAMPLE 4

Adhesive Lable With Paper Substrate

Adhesive labels were prepared for in-mold application. An aqueous dispersion was created with the following ingredients:

| Ingredient | Dry Weight (lb) | Wet Weight (lb) |
|---|---|---|
| Water | 0 | 191.7 |
| Ammonia | 0 | 6.0 |
| Adhesive | | |
| Ethylene-vinyl acetate latex | 607.6 | 1519.0 |
| Styrene-butadiene latex | 41.5 | 83.0 |
| Polystyrene latex | 160.8 | 402.0 |

The adhesives were the same as those used in Examples 1–3. These ingredients were mixed for about 10 minutes at room temperature so that the ingredients uniformly were dispersed.

This dispersion was coated onto 60 pound paper stock sold under the name STERLING C2S by Westvaco (Luke, Md.) using a gravure coater and dried as described in Example 1. The roughness value of the coating was 1.38 micrometers, the coefficient of friction was 0.700, and the blocking value at 110° F. was 3.

EXAMPLE 5

Starch Spacer Particles

Adhesive labels were prepared as in Example 4 with the addition of starch spacer particles. An aqueous dispersion was created with the following ingredients:

| Ingredient | Dry Weight (lb) | Wet Weight (lb) |
|---|---|---|
| Ammonia | 0 | 2.9 |
| Adhesive | | |
| Ethylene vinyl acetate latex | 299.05 | 742.6 |
| Styrene butadiene latex | 20.3 | 40.6 |
| Polystyrene latex | 78.6 | 196.5 |
| Acrylic | 9.2 | 22.9 |
| Unmodified potato starch | 27.4 | 33.0 |

The adhesives were the same as those used in Examples 1–4. The unmodified potato starch was the same as used for Example 2. The acrylic was added to thicken the coating and to facilitate the suspension of the starch in the coating mixture. The acrylic is sold under the name Carboset™ 514H and was obtained from B. F. Goodrich (Cleveland, Ohio). These ingredients were mixed for about 10 minutes at room temperature so that the ingredients uniformly were dispersed and the unmodified potato starch was suspended in the dispersion.

This dispersion was coated onto paper stock and dried as described in Example 3. The roughness value of the coating was 7.15 micrometers, the coefficient of friction was 0.488, and the blocking value at 110° F. was 2–3.

The results of the Examples 4 and 5 are summarized as follows:

| | Roughness ($\mu$m) | Coefficient of Friction | Blocking at 110° F. |
|---|---|---|---|
| Example 4 (no spacer particles) | 1.38 | 0.700 | 3 |
| Example 5 (starch spacer particles) | 7.15 | 0.488 | 2–3 |

COMPARATIVE EXAMPLE 6

Adhesive Lable With Polyethylene Terephthalate Substrate

A clear adhesive label was prepared for application to glass articles of manufacture. A dispersion was created with the following ingredients:

| Ingredient | Dry Weight (g) | Wet Weight (g) |
|---|---|---|
| Polyurethane | 97.5 | 278.57 |
| Fluorescent Brightener | 2.5 | 2.5 |
| Silane | 1.0 | 1.0 |

The polyurethane used is sold under the name Sancure™1601 by B. F. Goodrich (Cleveland, Ohio). The fluorescent brightener is a common additive to clear labels because it can be used to count labeled articles in an assembly line. The fluorescent brightener used is sold under the name Tinopal™ SCP available from Ciba-Geigy (Greensboro, N.C.). The silane was added to promote adhesion. The silane used is sold under the name WETLINK 78 by Witco (Cincinnati, Ohio). The ingredients were mixed for about 10 minutes at room temperature so that the ingredients uniformly were dispersed.

This dispersion was coated onto a 1.7 mil thick clear polyethylene terephthalate film obtained from Dupont (Wilmington, Del.) using a gravure coater and dried for about 20 seconds in an oven set at about 155° F. Adhesive labels then were cut from the adhesive label stock. Transfer of adhesive was observed when a hand-held roller heated to 140° F. was rolled across the adhesive coated side of the labels. The blocking value at 100° F. was 3. The labels were adhered to glass slides using a Sentincl Sealer from Sencorp Systems (Hyannis, Mass.) set at 200° F. and about 32 psi for about 2 seconds per slide. The adherence was measured at 767 g/inch, after one week it was measured at 717 g/inch, and after one month it was measured at 1000+g/in.

EXAMPLE 7

Starch Spacer Particles

An adhesive label was prepared as described in Example 6 with the addition of wheat starch spacer particles to the adhesive coating. A dispersion was created with the following ingredients:

| Ingredient | Dry Weight (g) | Wet Weight (g) |
|---|---|---|
| Polyurethane | 82.50 | 235.71 |
| Fluorescent Brightener | 2.50 | 2.50 |
| Wheat Starch | 5.00 | 17.05 |
| Silane | 1.00 | 1.00 |

The polyurethane, fluorescent brightener and silane were the same as used in Example 6. The wheat starch spacer particles used was sold under the name MSWS 100F obtained from Midwest Grain Products (Achison, Kans.) and had an average particle size of about 20 microns. The ingredients were mixed for about minutes at room temperature so that the ingredients uniformly were dispersed.

This dispersion was coated onto polyethylene terephthalate film and dried as in Example 6. Labels were cut and applied to glass slides as in Example 6. The blocking value of the resulting labels at 100° F. was 0. No transfer was observed when a hand-held roller heated to 140° F. was rolled across the adhesive coated side of the labels. The adherence was measured to be 617 g/in on freshly labeled slides, 583 g/in on labeled slides after one week, and 425 g/in on labeled slides after one month.

EXAMPLE 8

Microcrystalline Wax

An adhesive label was prepared as described in Example 6 with the addition of microcrystalline wax to the adhesive coating. A dispersion was created with the following ingredients:

| Ingredient | Dry Weight (g) | Wet Weight (g) |
|---|---|---|
| Polyurethane | 190.00 | 542.86 |
| Fluorescent Brightener | 5.10 | 5.10 |
| Microcrystalline Wax | 10.00 | 25.00 |
| Silane | 2.10 | 2.10 |

The polyurethane, fluorescent brightener and silane were the same as used in Example 6. The microcrystalline wax was obtained from Michelman (Cincinnati, Ohio) and is sold under the name ME48040. The ingredients were mixed for about 10 minutes at room temperature so that the ingredients uniformly were dispersed.

This dispersion was coated onto polyethylene terephthalate film and dried as in Examples 6–7. Labels were cut, printed and applied to glass vial as in Examples 6–7. The blocking value of the resulting labels at 100° F. was 3. No transfer of adhesive was observed when a hand-held roller heated to 140° F. was rolled across the adhesive coated side of the labels. The adherence was 1000+g/in on freshly labeled glass slides and 1000+g/in on one week old slides.

EXAMPLE 9

Starch Spacer Particles and Microcrystalline Wax

An adhesive label was prepared as described in Example 6 except that no silane was used and wheat starch spacer particles and microcrystalline wax were added to the adhesive coating. A dispersion was created with the following ingredients:

| Ingredient | Dry Weight (g) | Wet Weight (g) |
|---|---|---|
| Polyurethane | 67.50 | 192.86 |
| Fluorescent Brightener | 2.50 | 2.50 |
| Wheat Starch | 15.00 | 17.05 |
| Microcrystalline Wax | 15.00 | 37.50 |

The polyurethane and fluorescent brightener were the same as used in Examples 6–8. The wheat starch spacer particles were the same as used in Example 7 and the microcrystalline wax was the same as used in Example 8. The ingredients were mixed for about 10 minutes at room temperature so that the ingredients uniformly were dispersed.

This dispersion was coated onto polyethylene terephthalate film and dried as in Examples 6–8. Labels were cut and applied to glass slides as in Examples 6–8. The blocking value of the resulting labels at 100° F. was 0. No transfer was observed. The adherence was measured to be 833 g/in on freshly labeled slides, 700 g/in on labeled slides after one week, and 825 g/in on labeled slides after one month.

The results of Examples 6–9 are summarized as follows:

|  | Blocking at 100° F. | Transfer (Yes/No) | Adherence (fresh/1 week/1 month) |
|---|---|---|---|
| Example 6 (control) | 3 | Yes | 767/717/1000+ |
| Example 7 (starch spacer particles) | 0 | No | 617/583/425 |
| Example 8 (microcrystalline wax) | 3 | No | 1000+/1000+/not yet available |
| Example 9 (microcrystalline wax and starch spacer particles) | 0 | No | 833/700/825 |

Examples 1–5 demonstrate that the addition of spacer particles increases the roughness of the adhesive coating, decreases the coefficient of friction of the adhesive coating, and improves the blocking values of the coated labels. Examples 6–9 demonstrate the addition of spacer particles improves blocking values and transfer. Furthermore, as can be seen from the results of Examples 6–9, the addition of both the spacer particles and the non-blocking agent eliminated blocking and transfer while maintaining adhesion at acceptable levels.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A heat-sealable adhesive label comprising:
   a substrate having a first surface and a second surface; and
   an adhesive coating disposed on the first surface of the substrate, the adhesive coating comprising an adhesive and a plurality of spacer particles that impart roughness to the adhesive coating,
wherein the plurality of spacer particles comprise starch particles.

2. The adhesive label of claim 1 wherein the spacer particles have an average particle size of between about 8 microns and about 60 microns.

3. The adhesive label of claim 1 wherein the spacer particles are spheroidal.

4. The adhesive label of claim 1 wherein the adhesive is selected from the group consisting of ethylene copolymers, ethylene-vinyl acetates, polyvinyl acetates, styrene-butadiene copolymers, polystyrenes, acrylics, ethylene acrylates, methacrylics, ethylene methacrylates, polyurethanes and combinations of these adhesives.

5. The adhesive label of claim 4 wherein the adhesive comprises ethylene-vinyl acetate.

6. The adhesive label of claim 4 wherein the adhesive comprises polyurethane.

7. The adhesive label of claim 1 wherein the substrate is selected from the group consisting of polyethylene film, polypropylene film, polyethylene terephthalate film, polyextruded photobase paper and paper.

8. The adhesive label of claim 1 wherein the spacer particles comprise between about 2 dry weight percent and about 20 dry weight percent of the adhesive coating.

9. The adhesive label of claim 1 further comprising a non-blocking agent.

10. The adhesive label of claim 9 wherein the non-blocking agent comprises a microcrystalline wax.

11. The adhesive label of claim 1 wherein the starch particles are selected from the group consisting of unmodified potato starch particles and wheat starch particles.

12. A heat-sealable adhesive label comprising:
   a substrate selected from the group consisting of polypropylene and paper, the substrate having a first surface and a second surface; and
   an adhesive coating disposed on the first surface of the substrate, the adhesive coating comprising an adhesive and a plurality of starch particles that impart roughness to the adhesive coating.

13. The adhesive label of claim 12 wherein the adhesive comprises ethylene-vinyl acetate, styrene butadiene and polystyrene.

14. A heat-sealable adhesive label comprising:
   a polyethylene terephthalate substrate having a first surface and a second surface; and
   an adhesive coating disposed on the first surface of the substrate, the adhesive coating comprising an adhesive and a plurality of starch particles that impart roughness to the adhesive coating.

15. The adhesive label of claim 14 wherein the adhesive comprises a polyurethane, and the adhesive coating further comprises a fluorescent brightener and an adhesion promoter.

16. The adhesive label of claim 15 wherein the adhesive coating further comprises a non-blocking agent.

17. The adhesive label of claim 16 wherein the non-blocking agent comprises a microcrystalline wax.

* * * * *